(12) United States Patent
Klaar

(10) Patent No.: US 6,960,922 B2
(45) Date of Patent: Nov. 1, 2005

(54) APPARATUS FOR MONITORING A SLIDING CONTACT ELEMENT IN AN ELECTRICAL ROTATING MACHINE

(75) Inventor: Juergen Klaar, Neukirchen-Vluyn (DE)

(73) Assignee: Siemens Aktiengesellschaft, Munich (DE)

( * ) Notice: Subject to any disclaimer, the term of this patent is extended or adjusted under 35 U.S.C. 154(b) by 516 days.

(21) Appl. No.: 10/180,107

(22) Filed: Jun. 27, 2002

(65) Prior Publication Data
US 2003/0011388 A1 Jan. 16, 2003

(30) Foreign Application Priority Data
Jun. 28, 2001 (EP) .............................. 01115808

(51) Int. Cl.[7] .............................................. G01R 27/08
(52) U.S. Cl. ...................................... 324/723; 356/450
(58) Field of Search ......................... 356/450; 324/723

(56) References Cited

U.S. PATENT DOCUMENTS

| | | | | |
|---|---|---|---|---|
| 4,390,870 A | | 6/1983 | Michael ...................... | 340/648 |
| 4,528,557 A | * | 7/1985 | Braun ........................ | 340/648 |
| 4,636,778 A | * | 1/1987 | Corkran et al. ............. | 340/648 |
| 4,977,345 A | * | 12/1990 | Toperzer ..................... | 310/242 |
| 5,901,400 A | * | 5/1999 | Fulop ............................ | 15/88 |
| 6,034,531 A | | 3/2000 | Senglat et al. .............. | 324/699 |
| 6,067,159 A | * | 5/2000 | Discenzo et al. ........... | 356/450 |
| 6,111,643 A | * | 8/2000 | Discenzo et al. ........... | 356/450 |
| 6,495,940 B2 | * | 12/2002 | Kliman et al. .............. | 310/143 |

FOREIGN PATENT DOCUMENTS

| | | | | |
|---|---|---|---|---|
| DE | 196 19 728 | | 5/1996 | |
| DE | 196 19 733 | | 5/1996 | |
| DE | 197 58 235 | | 12/1997 | |
| EP | 0 920 092 | | 10/1998 | |
| GB | 1 488 837 | | 6/1974 | |
| JP | 01321845 A | * | 12/1989 | .......... H02K/13/00 |
| JP | 04127859 A | * | 4/1992 | .......... H02K/13/00 |

* cited by examiner

*Primary Examiner*—Charles H. Nolan, Jr.
(74) *Attorney, Agent, or Firm*—Harness, Dickey & Pierce, P.L.C.

(57) ABSTRACT

An apparatus for monitoring a sliding contact element in an electrical rotating machine, in particular a generator, includes a holder for the sliding contact element and a sensor for detection of a state variable of the sliding contact element. An evaluation unit is also provided for evaluation of the state variable which is detected by the sensor, with signals from the sensor being transmitted to the evaluation unit without using wires. The wire-free transmission makes the apparatus particularly maintenance-friendly.

39 Claims, 7 Drawing Sheets

APPARATUS FOR MONITORING A SLIDING CONTACT ELEMENT IN AN ELECTRICAL ROTATING MACHINE

The present application hereby claims priority under 35 U.S.C. Section 119 on European Patent application number 01115808.6 filed Jun. 28, 2001, the entire contents of which are hereby incorporated by reference.

FIELD OF THE INVENTION

The invention generally relates to an apparatus for monitoring a sliding contact element in a electrical rotating machine. In particular, it preferably relates to a turbo-generator, having a holder for the sliding contact element and having a sensor for detection of a state variable of the sliding contact element, and having an evaluation unit for evaluation of the state variable which is detected by the sensor.

The invention may preferably relate, in particular, to a plug-in brush holder for a turbo-generator with slip-rings, or for an exciter machine with commutators. A carbon brush is inserted into the plug-in brush holder, as a replaceable sliding contact element.

An electrical rotating machine generally has a field winding on a rotor. A field current is supplied to the field winding via slip-rings, using carbon brushes. The magnitude of the field current is dependent on the required power in the case of generators which are used for power supply purposes. A certain specific current load is required on the brushes in order to transmit the field current through the carbon brushes as well as possible. The current is supplied via rotating slip-rings and stationary carbon brushes, which make contact with the slip-rings. During the contact, the brushes slide on the corresponding rotationally symmetrical surfaces of the slip-rings. As a result of this, the brushes are subject to high wear.

The brushes may be arranged in the so-called plug-in brush holders which, for their part, are held in stationary rings. The plug-in brush holders and the rings are designed such that the plug-in brush holders can be removed from the holder relatively easily. The brush, in particular carbon brush, which is arranged in the plug-in brush holder must be replaced once the brush has reached its minimum permissible length.

Owing to the high wear and since, furthermore, the lives of the individual carbon brushes differ widely, the wear of the carbon brushes must be checked at relatively short time intervals, during the course of maintenance work. Such maintenance work is carried out during operation at the operating voltage. Owing to the hazardous potential, the maintenance work must be carried out only by appropriately trained specialist personnel. Furthermore, this maintenance work is very time-consuming since, for example in the case of a turbo-generator set with a field current of 6000 amperes, it is necessary to maintain approximately 120 carbon brushes.

In general, the system between the carbon brushes and slip-rings or commutators—in addition to the normal wear—is also highly susceptible to defects and must therefore additionally be monitored. Disturbance variables are an excessively high wear, and excessively high temperature, a so-called brush fire and, associated with this, so-called burn marks, unacceptable oscillations and rattling, and brushes being knocked out, etc. Complex test instrumentation is generally required for fault localization, with measurement lines which are routed from the respective carbon brush to a corresponding evaluation unit. In this case, ventilation and silencing devices, filters etc., often first of all have to be removed in order to make it possible to connect the measurement lines to the respective carbon brush to be checked. In this case, the work is carried out while voltages are present, which represents a hazardous potential.

BACKGROUND OF THE INVENTION

An apparatus for monitoring the wear of the carbon brushes can be found, by way of example, in DE 197 58 235, DE 196 19 728 A1, and DE 196 19 733 A1. Various sensor systems for detection of the wear are provided in these documents.

Particularly in DE 196 19 733, optical sensors as well as inductive, capacitive or opto-electrical movement sensors are provided, via which the position and hence the wear of the carbon brush are intended to be detected. Furthermore, a piezoelectric sensor is provided as a force sensor for determining the spring force with which the carbon brush is pressed against the slip-ring. In addition, a fluid system is described, in which, beyond a certain carbon brush wear level, a flow path for compressed air is opened or closed.

All known systems require complex line routing, for example with electrical lines from the sensors to an evaluation and detection unit outside the plug-in brush holder or, by way of example, complex compressed air lines. When the carbon brushes are replaced, these lines must first of all be detached and must then be reconnected which, overall, leads to brush replacement being a time-consuming process. Particularly when the sensors are connected via electrical lines to an evaluation unit, additional measures are required for potential isolation and to withstand voltages.

SUMMARY OF THE INVENTION

An embodiment of the invention may be based on an object of specifying an apparatus for monitoring a sliding contact element, which ensures a safe and reliable operation. In particular, it may also be maintenance-friendly, as well as cost-effective.

According to an embodiment of the invention, a sensor is provided to detect a state variable of a sliding contact element which is held in a holder, in particular a carbon brush, and to be supplied to an evaluation unit for evaluation, with signals being transmitted to the evaluation unit without using wires.

The wire-free transmission avoids complex line routing between the holder, in particular a plug-in brush holder, and the evaluation unit. Thus, during servicing, there is no need for additional measures for disconnection and for reconnection of the lines.

The wire-free monitoring furthermore may allow continuous monitoring for possible defects as well, in addition to the normal wear. This is no need for any complex additional test instrumentation or for disassembly of corresponding devices in order to gain access to the plug-in brush holder. Overall, this results in a very high level of maintenance friendliness.

Furthermore, no direct work is required in the region of live parts for monitoring. In fact, monitoring is carried out in a decentralized manner via the monitoring unit, and may also be carried out automatically, if required. Even automatic protection measures on identification of an unacceptable operating state, for example emergency disconnection of the generator, can be initiated automatically.

Since, furthermore, there is no need to route any special lines to the plug-in brush holders, this system can easily be retrofitted to existing plug-in brushes. In addition, there is no need for any changes to the fundamental design of the carbon brushes. Furthermore, the risk of a short circuit is averted owing to the lack of measurement lines and, furthermore, there is no need for any measures for potential isolation between the individual sensors. In addition, conventional microelectronics systems can be used for the wire-free transmission of the signals, which not only occupy only a small amount of space but are also highly cost-effective.

An embodiment of the invention expediently provides for the signals to be transmitted via radio waves or optoelectronically. A frequency band around 433 MHz may be used, in particular, in this case, for the radio waves. Infrared signals may be used, in particular, for the optoelectronic transmission. These measures ensure safe, reliable and disturbance-free signal transmission.

An embodiment of the invention further advantageously provides for the sensor to be connected to an electronics module, which has a transmission module for transmission of the signals. The measurement signals detected by the sensor are in this case advantageously converted in the electronics module to the signals which are intended for transmission and are emitted from the signal module. Further functions may be integrated in the electronics module, and initial processing of measurement signals may be carried out.

An autonomous power supply, for example via a battery, may be expediently provided for operation of the sensor and of the electronics module, thus, overall, ensuring reliable and safe monitoring at all times, independently of a central power supply.

In one preferred requirement, the electronics module also has a buffer store for storage of the detected measurement signals. This makes it possible to carry out a continuous measurement with the sensor, to transmit the signals associated with this measurement data only at specific times, or to transmit these signals only on request to the evaluation unit.

In particular, this opens up the capability to detect the signals from a number of sensors jointly in the evaluation unit, as is provided in one preferred development. If the measurement signals are buffer-stored in the electronics module, the data interchange with the evaluation unit takes place intermittently, that is to say alternately.

Furthermore, an embodiment of the invention preferably provides for the signals which are transmitted to the evaluation unit to have a coding. This coding is specifically associated with the individual sliding contact elements and with the respective sensors or electronics modules associated with them. The coding in this case includes, for example, an identification number, the location at which the sliding contact element is located, as well as the date and the time at which the measurement signal was detected.

For safe and reliable detection of the wear of the sliding contact element, the sensor may be constructed in two parts on the transmitter-receiver principle, with one part being arranged such that it is stationary, and the other part being arranged such that it moves in a manner correlated to the wear. The two parts are in this case preferably in the form of a permanent magnet and a relay, in particular a so-called reed relay. When the permanent magnet reaches the relay, this relay is switched. The switching signal is passed on as a measurement signal to the electronics module. The relative movement between the relay and the permanent magnet is caused by the increasing wear of the sliding contact element.

A number of permanent magnets, associated with the relay, may be in this case expediently provided at different positions. This serves to determine different wear values. This thus also creates the capability to track the amount of wear in discrete steps.

Alternatively or in addition to this, a number of relays, which are at a distance from one another, may also be expediently provided. The different position of these relays likewise serves to determine different wear values, which can be detected independently of one another. For this purpose, in particular, the measurement signals for the individual relays may be unambiguously associated with the respective relay and provided with an appropriate coding, which allows the respective relay to be identified, during the processing to form the signal which is to be transmitted to the evaluation unit.

In order to achieve a structure which is as compact and integral as possible, the sensor may be arranged together with the sliding contact element in a housing of the holder. The housing may include a sliding contact receptacle for the sliding contact element, which is connected to a tubular housing part with an internal telescopic tube. A moving element which may be rigidly connected to the telescopic tube, may extend into the telescopic tube, and the moving part of the sensor may be arranged on it. The telescopic tube my interact with the sliding contact element so that any position change resulting from wear leads to a movement of the moving part of the sensor. The fixed part of the sensor, on the other hand, may be arranged in a fixed position in the interior of the tubular housing part, once at has been adjusted and fitted.

In this case, the moving element is preferably in the form of a tube, in particular an electrically non-conductive plastic tube, on whose inner wall the moving part of the sensor is arranged. The invention may additionally provide for an instrumentation lance with the stationary part to be guided into the interior of this tube. The instrumentation lance is in this case preferably likewise tubular, with lines to the electronics module being routed in its interior. A structure such as this results in a very compact structure overall. Furthermore, an arrangement such as this can be retrofitted in conventional plug-in brush holders with relatively little installation effort. As an alternative to this, the instrumentation lance may also comprise or surround the moving element.

In order to detect further disturbance variables in addition to the normal wear, or else in addition to the excessive wear, an oscillation sensor, a temperature sensor, a current sensor and/or a spring force sensor may additionally or alternatively be provided in preferred developments.

The oscillation sensor may be used for detection of unacceptable oscillations of the sliding contact element. In particular, the accelerations of the sliding contact element during operation are evaluated for this purpose. The oscillations that occur often act in a number of directions. The oscillation sensor can thus preferably detect different oscillation directions such that they can be distinguished from one another. The oscillation direction and oscillation frequency make it possible to deduce the nature of the oscillation, and the hazard potential associated with it.

In the case of oscillations, there is a problem in distinguishing between permissible oscillations and critical oscillations. One preferred development therefore provides for the capability to store the measurement signals which are detected by the oscillation sensor, and for the evaluation unit to be designed to carry out a long-term comparison. A long-term comparison such as this offers a very good capability for assessment of the oscillations.

The temperature sensor may be used for detection of the temperatures which occur in the region of the sliding contact elements. Unacceptably high temperatures are thus detected in a simple manner. The temperature sensor can be used in particular for continuous monitoring during operation. Defects can thus be identified at an early stage as a result of an increase in temperature, and appropriate countermeasures can be taken to avoid possible serious consequential damage. In this case, one expedient development provides for there to be a hole in the sliding contact element, leading in the direction of the end face that is subject to the wear. If required, the temperature sensor may move in this hole. It is thus also possible to detect the temperature directly on that face of the sliding contact element which is subject to wear.

One major element for reliable operation is the current flowing via the sliding contact element. Its detection via the current sensor thus allows early identification of contact-making faults between the sliding contact element and the slip-ring.

The spring stress sensor is used for detection of spring stress in a spring acting on the sliding contact element. This spring may be used to press the sliding contact element against the slip-ring. The spring stress makes it possible to deduce firstly the wear and secondly any reduction in the contact pressure, and hence a defective contact between the sliding contact element and the slip-ring.

BRIEF DESCRIPTION OF THE DRAWINGS

Exemplary embodiments of the invention will be explained in more detail in the following text with reference to the figures, in which, in each case illustrated schematically.

Parts having the same effect are provided with the same reference symbols in the figures.

DETAILED DESCRIPTION OF THE PREFERRED EMBODIMENTS

Figure 1:
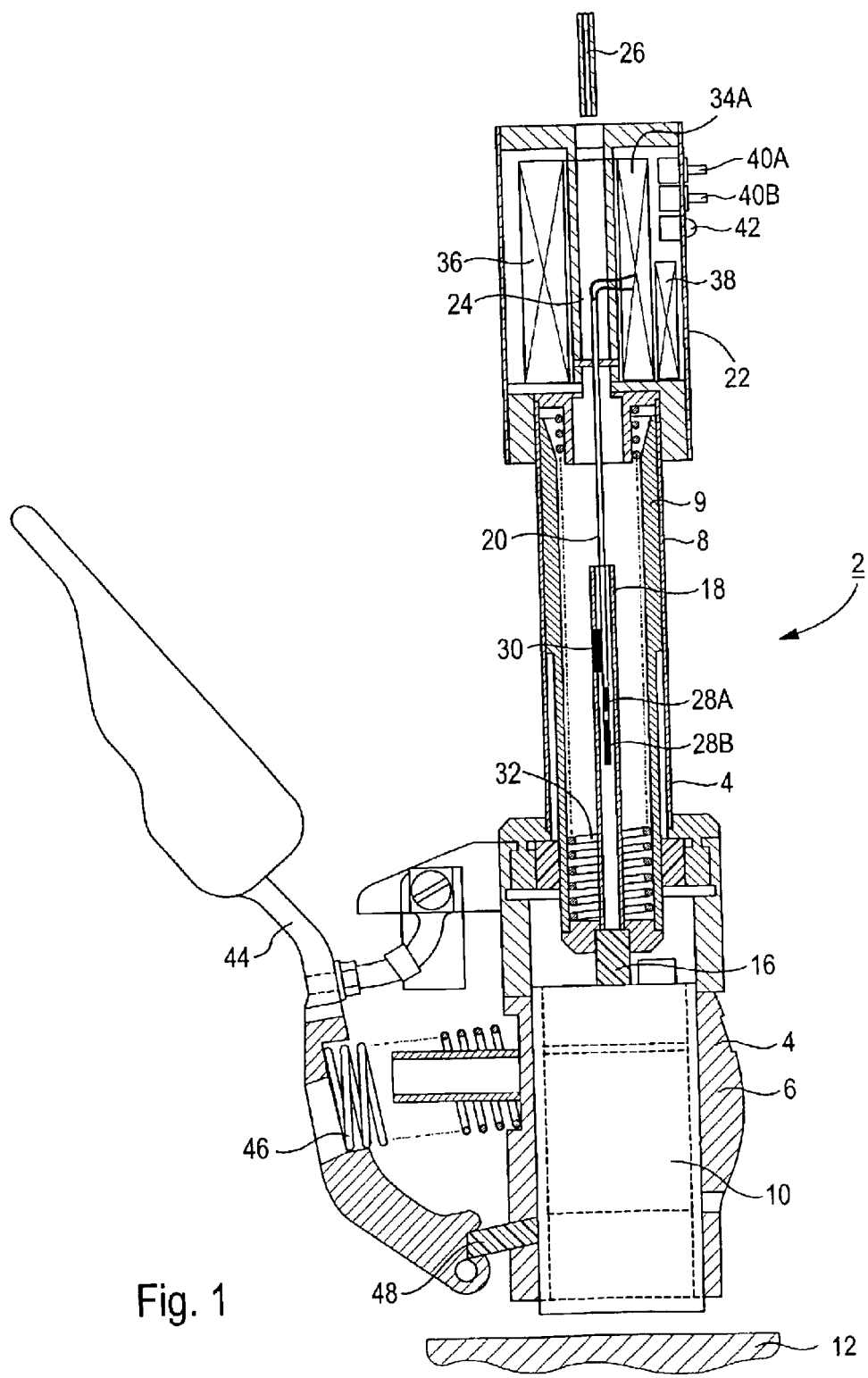
FIG. 1 shows a plug-in brush holder with a sensor arrangement for detection of the wear of a sliding contact element, and with an electronics module which is designed for transmission of radio signals.

A plug-in brush holder 2 as shown in FIG. 1 has a housing 4 which, in a lower region, has a sliding contact receptacle 6, and a tubular housing part 8 connected to it. A telescopic tube 9 is arranged in the interior of the housing part 8. A sliding contact element 10, in particular a carbon brush, is arranged in the sliding contact receptacle 6. During operation, the sliding contact element 10 is in contact with a slip-ring 12.

The telescopic tube 9 is passed through an end-face boundary 14 of the sliding contact receptacle 6, to the latter. The end faces of the telescopic tube 9 are sealed, and the connecting element 16 on the telescopic tube 9 presses against the head face of the sliding contact element 10. A plastic tube 18, which extends into the interior of the telescopic tube 9, is seated on this connecting element 16. An instrumentation lance 20 in turn extends into the plastic tube 18, from above. This instrumentation lance 20 is likewise tubular, and is connected to an electronics module 22. The electronics module 22 is in this case seated on the tubular housing part 8. The electronics module 22 has a central recess 24, through which a measurement lance 26 can be passed and can be inserted into the telescopic tube 9 as far as the connecting element 16.

The measurement lance 26 is in this case preferably in the form of a measurement tube, which is provided with slots at the end, for example like a fork. The measurement lance 26 makes it possible, by way of example, to manually measure the wear of the sliding contact element 10. This is expedient, particularly if the wear is not measured automatically, as is provided, by way of example, according to the exemplary embodiments shown in FIGS. 6 and 7.

Two relays 28A,B are mounted at a distance from one another at the end of the instrumentation lance 20 and, in particular, are in the form of reed relays. A permanent magnet 30 is arranged on the inner wall of the plastic tube 18. An electrical line is routed from each of the two relays 28A,B in the interior of the instrumentation lance 20 to the electronics module 22. The relays 28 are held in a fixed position. For this purpose, the instrumentation lance 20 is rigidly attached to the electronics module 22. In contrast, the permanent magnet 30 is arranged such that it can move since, as the sliding contact element 10 wears, it is moved as appropriate in the direction of the slip-ring 12 by a compression spring 22, which is arranged in the interior of the telescopic tube. In the process, the plastic tube 18 which is connected to the sliding contact element 10 via the connecting element 16 necessarily also moves, so that the permanent magnet 30 moves in the direction of the slip-ring 12.

As soon as the permanent magnet 30 reaches the first relay 28A, this first relay 28A switches, and thus emits a voltage pulse to the electronics module 22, where this measurement signal is preprocessed in a signal module 34A to form a radio signal, which is emitted without using wires. In addition to the signal module 34A, the electronics module 22 has a replaceable battery 36, which ensures that there is an autonomous power supply for the electronics module 22. A voltage limit value sensor 38, two pushbuttons 40A,B and a control lamp 42 are also provided in the electronics module 22, with the control lamp 42 illuminating when the sliding contact element 10 reaches its minimum permissible length. The pushbuttons 40A,B are used, inter alia, for functional checking of the relays. The transmission module 34A emits radio signals, for example in the frequency band around 433 MHz.

The plug-in brush holder 2 also has a grip lever 44, which is mounted on the sliding contact receptacle 6 such that it can pivot. A spring 46 is arranged between the grip lever 44 and the sliding contact receptacle 6, forcing the grip lever 44 away from the pivoting contact receptacle 6. At its lower end, the grip lever 44 acts on a clamping body 48. The grip lever 44 together with the clamping body 48 are used to secure the sliding contact element 10 in the sliding contact receptacle 6, and allow replacement of the sliding contact element 10.

During operation of the electrical machine, in particular of the generator, the rotating slip-ring 12 slides along the sliding contact element 10. The latter is thus increasingly worn away, and is readjusted via the compression spring 32. As the amount of wear increases, the permanent magnet 30 thus first of all approaches the first relay 28A. As soon as it reaches this first relay 28A, said relay 28A switches, and a corresponding radio signal is produced. The production of this first radio signal is in this case correlated with a first wear limit value which indicates, for example, that the sliding contact element 10 now has only a predetermined remaining possible operating live. As the sliding contact element 10 is worn away further, the permanent magnet 30 also reaches the second relay 28B, and switches it, so that a second radio signal is emitted. This second radio signal is an indication that a further wear limit value has been reached which now, by way of example, indicates the absolute wear limit and indicates that there is an urgent need to replace the sliding contact element 10.

The individual relays 28A,B have respectively associated coded radio signals, with the coding being carried out in the electronics module 22 such that it is possible to distinguish between the two radio signals associated with the relays 28A,B. As an alternative to the configuration with the two relays 28A,B, it is also possible to provide a number of permanent magnets 30 on the inner wall of the plastic tube 18. The wear can be monitored continuously by following the signals caused by the relay 28.

Figure 2:
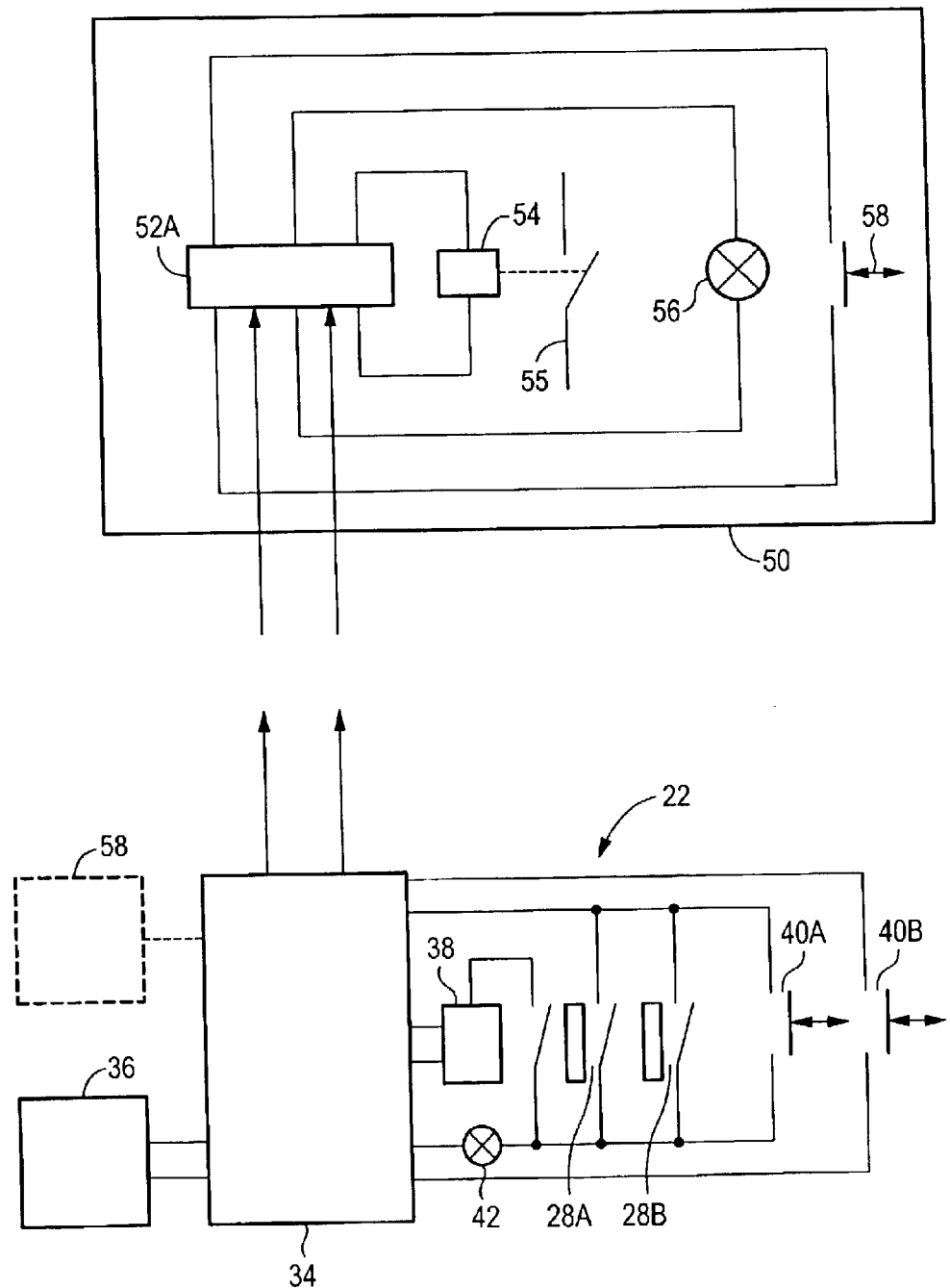
FIG. 2 shows a greatly simplified block diagram to illustrate the signal processing with the electronics module shown in FIG. 1.

The transmission of the radio signals from the electronics module 22 to an evaluation unit 50 is shown, on the basis of the block diagram illustrated there, in FIG. 2. The evaluation unit 50 is at the same time in the form of a receiving station for the incoming radio signals, and has a receiving module 52A which detects the radio signals. The receiving module 52A actuates a switch 54, which closes an electrically floating line contact 55, for example to a console for passing on signals. Furthermore, an indication lamp 56 is activated at the same time, and an on/off pushbutton is provided for acknowledgement. The block diagram illustration of the electronics module 22 shows the individual elements which have already been described with reference to FIG. 1, namely the battery 36, the signal module 34, the voltage limit value transmitter 38 and the two pushbuttons 40A,B. In this block diagram, the two relays 28A,B are associated with the operation of the electronics module 22. One pushbutton 40A is in the form of a test pushbutton, using which the serviceability can be checked. The second pushbutton 40B is used for signal coding. In this case, the second pushbutton 40B is used during initial installation to program the signal module 34 appropriately such that coded radio signals are transmitted to the evaluation unit 50.

A buffer store 58 may also be provided in the electronics module 22 (represented by dashed lines). The already preprocessed signals are preferably buffer-stored in the buffer store 58 and are transmitted to the evaluation unit 50 either at regular periodic time intervals, or only in response to a request from the evaluation unit 50. FIG. 2 shows only the data interchange between the signal module 34A and the receiving module 52A. However, the two modules 34A, 52A are preferably designed to be not only transmitting modules but also receiving modules, so that they can communicate and interchange data with one another.

Figure 3:
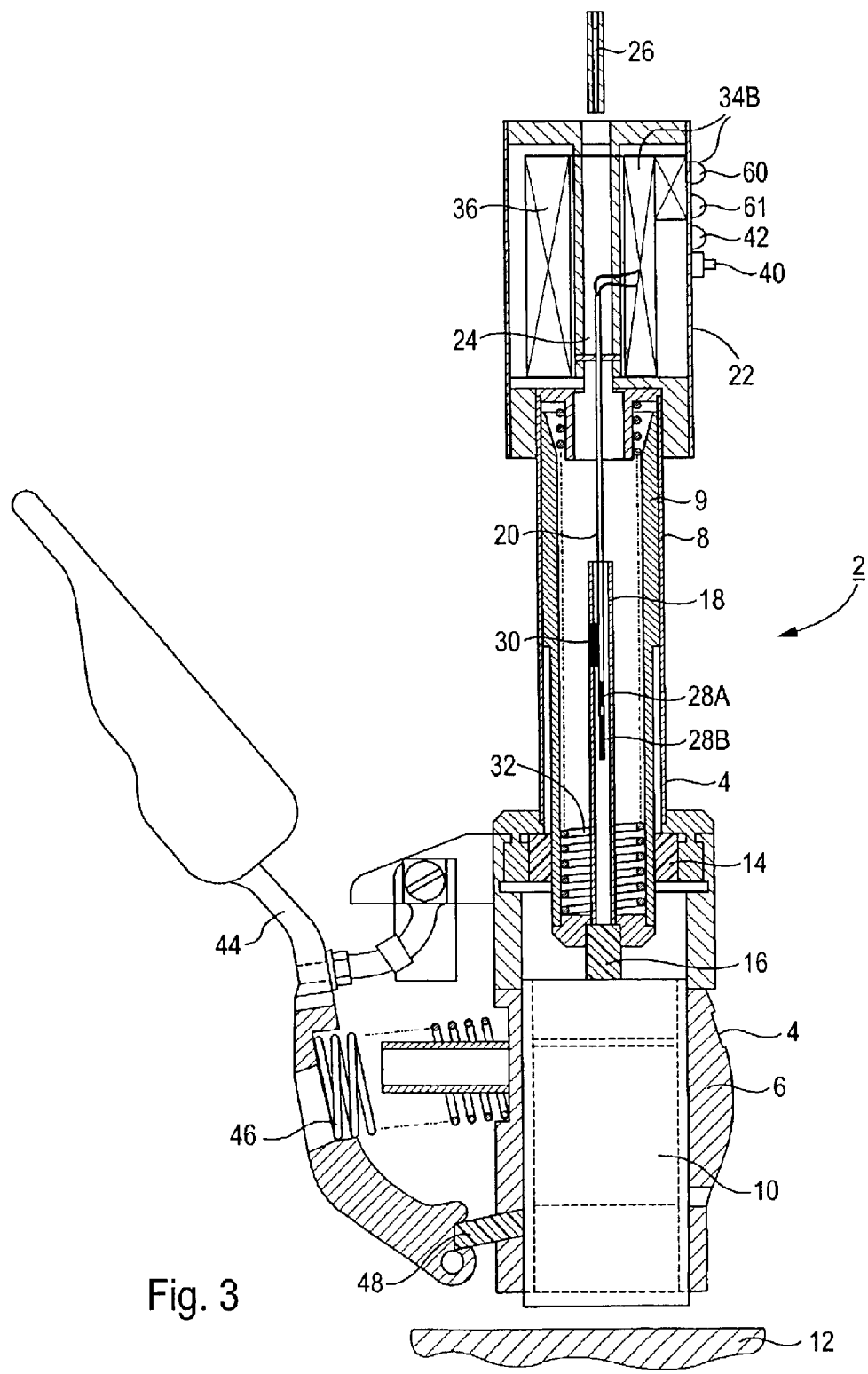
FIG. 3 shows an illustration which is comparable to FIG. 1, with the electronics module being designed for transmission of infrared signals.

The plug-in brush holder 2 as shown in FIG. 3 is essentially physically identical to that shown in FIG. 1, with a signal module 34B now being provided for the emission of infrared signals. This transmission module 34B can also preferably be programmed and coded in the same way as the transmitting module 34A. In order to emit the infrared signals, the transmitting modules 34B has an infrared lamp 60, and an infrared detector 61 is provided for signal reception.

Figure 4:
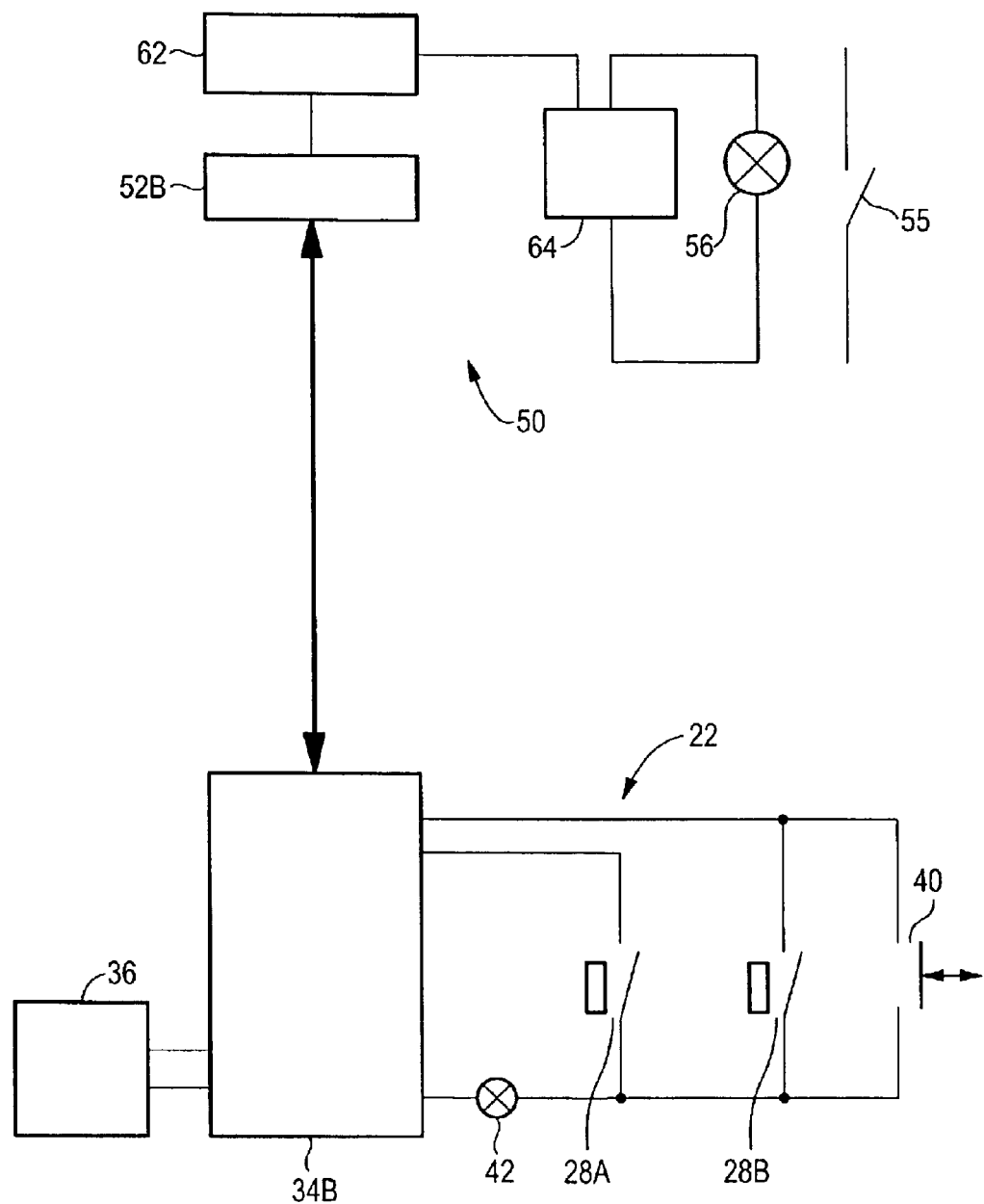
FIG. 4 shows a simplified block diagram to illustrate the signal processing with the electronics module shown in FIG. 3.

The block diagram, which is correlated with the exemplary embodiment shown in FIG. 3, is illustrated in FIG. 4. In this case as well, the two relays 28A,B are once again associated with the electronics module 22, as functional components. The evaluation unit 50 has a receiving module 52B, which is now designed to receive and emit infrared signals. The double arrow between transmitting module 34B and the receiving module 52B indicates that both modules 34B, 52B are designed not only to transmit but also to receive infrared signals. The receiving module 52B is connected via an infrared interface to a computer 62, which initiates the further evaluation and, in particular, actuates a switching device 64 so that, when an appropriate signal occurs, the indication lamp 56 is activated and the electrically floating line contact 55 to the console is closed.

Figure 5:
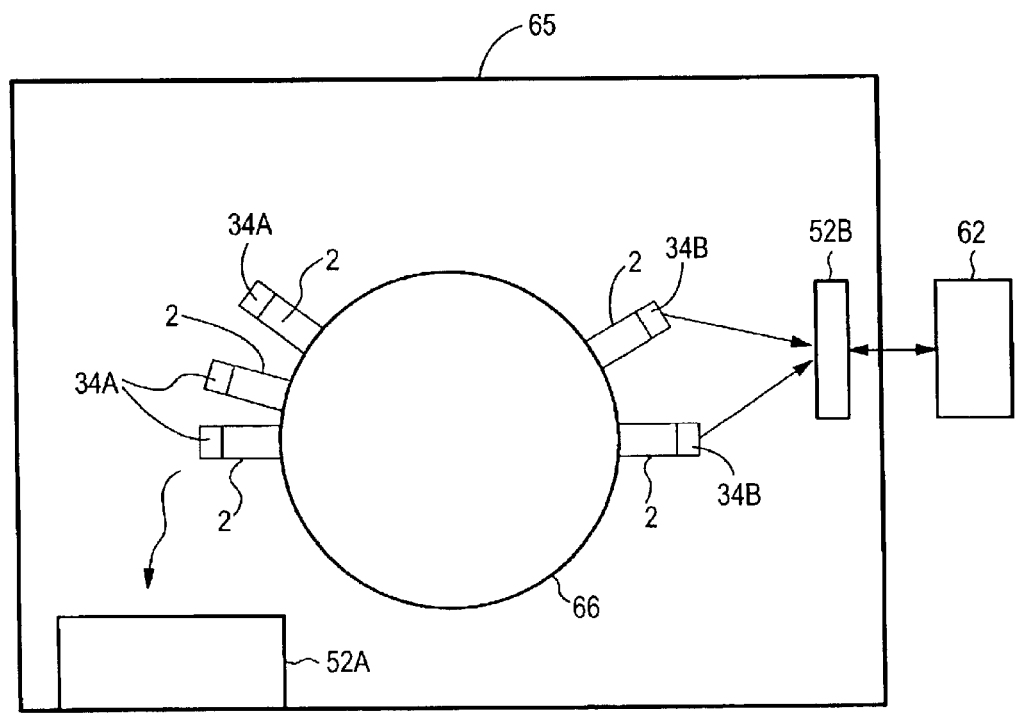
FIG. 5 shows a highly simplified illustration, showing the interaction of the individual sub-elements of the apparatus for monitoring.

FIG. 5 shows the principle of the interaction of the individual elements which are provided for monitoring the slip-ring contact elements 10. According to this figure, a plug-in brush holder mount 66 is arranged in an air guide shroud 65, and has a number of plug-in brush holders 2 on its circumference. The plug-in brush holders 2 each have a signal module 34A,B, via which coded signals, which relate to a specific sliding contact element, are emitted. In this case, the three signal modules 34A shown in the left-hand half of the figure are designed to emit radio signals, which are received by a corresponding receiving module 52A for the radio signals. In contrast, the two signal modules 34B in the right-hand half of the figure are designed to emit infrared signals, which are received by the associated receiving module 52B. The latter is in contact with the computer 62 via an infrared link.

As already mentioned, the receiving modules 52A,B of the evaluation units 50 are also designed to be transmitting units, so that data can be transmitted to the electronics modules. This path provides the capability to code and to adjust the corresponding electronics modules 22.

Figure 6:
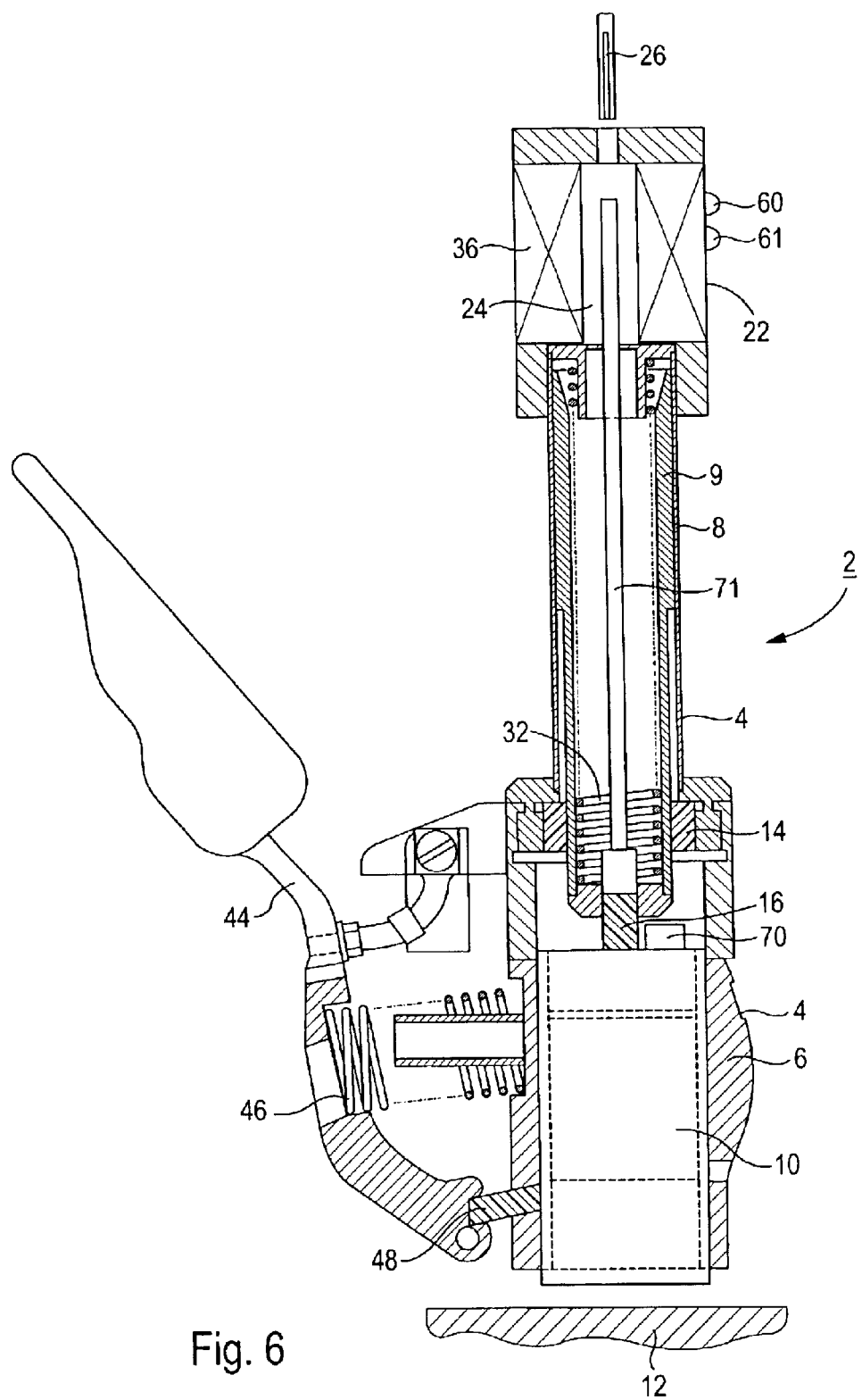
FIG. 6 shows an illustration which is comparable to FIG. 1 and in which an oscillation sensor is arranged instead of the sensor arrangement for wear detection.

In the plug-in brush holder shown in FIG. 6, there is no measurement arrangement for automatic wear determination. In this case, the wear is determined manually, via the measurement lance 26. According to this exemplary embodiment, an oscillation sensor 68 is provided, which is arranged directly adjacent to the connecting element 16. Oscillation movements of the sliding contact element 10 are thus detected directly by the oscillation sensor which, in this case, is in particular in the form of an analogue or digital acceleration sensor.

In this case, it is in the form of a sensor with a multidimensional measurement capability, in order to make it possible to detect, and to distinguish between, oscillations in different oscillation directions. The oscillation sensor 68 is connected to a line tube 70, in which the measurement lines are routed to the electronics module 22. Signal transmission takes place in this case by infrared signals. Accelerations measured by the oscillation sensor 68 are then analyzed in the evaluation unit 50, which may be the computer 62, in order to determine oscillation frequencies, amplitudes and phases.

The computer 62 is also used, in particular, to carry out a long-term comparison of the detected oscillation data. The analysis makes it possible to diagnose defects resulting, by way of example, from shaft oscillations resulting from the slip-rings not being completely circular due to burn marks on the slip-rings or due to oscillations of the sliding contact elements 10. As soon as a predetermined acceleration value is exceeded, an appropriate limit value signal is produced. In order to detect the oscillations of the sliding contact element 10, which may be evident due to a rattling sound, the oscillation sensor 68 is preferably mounted directly on the head face of the sliding contact element 10, as is indicated by the second oscillation sensor 70. The two oscillation sensors 68, 70 may also be used at the same time.

Figure 7:
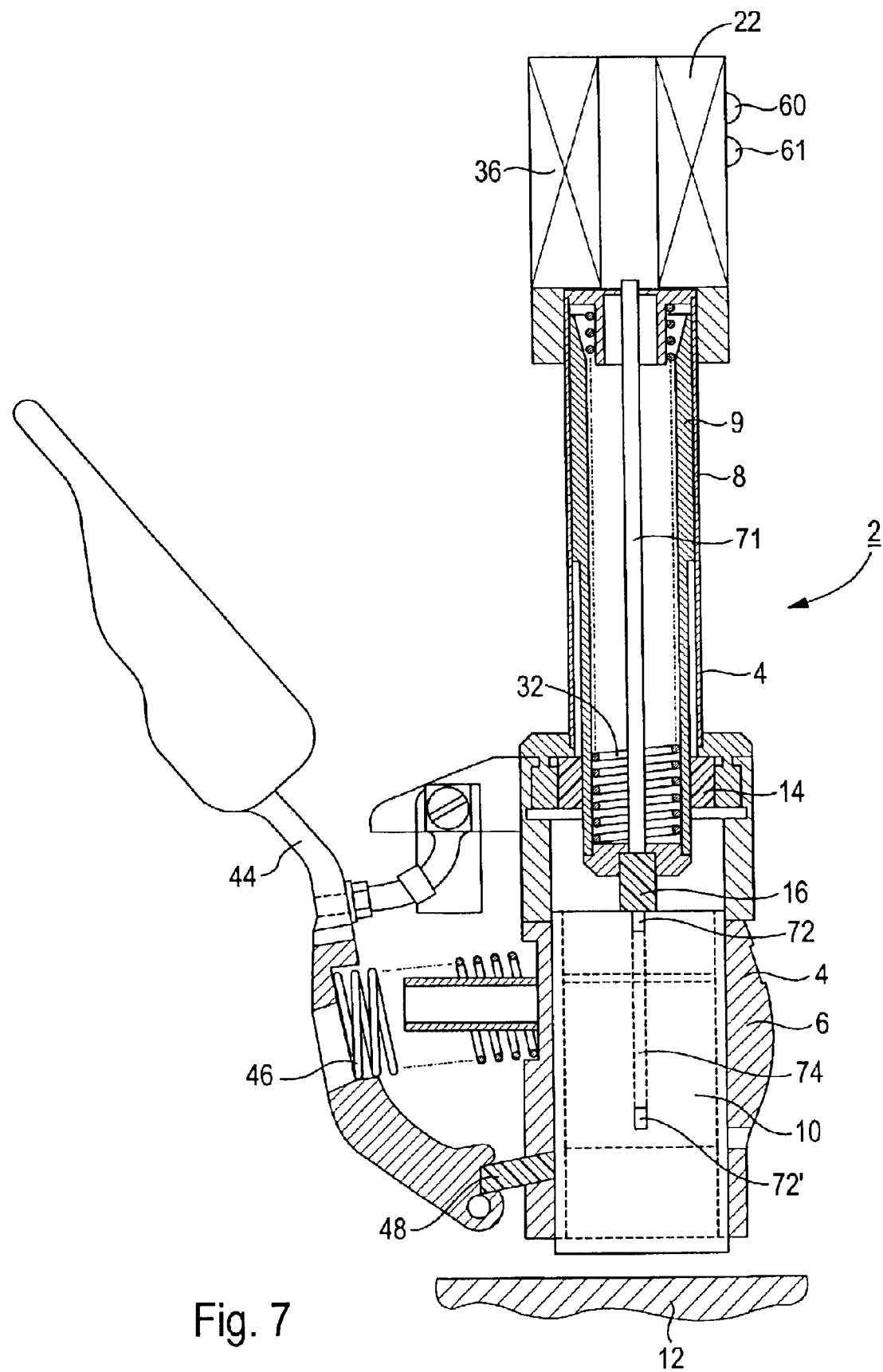
FIG. 7 shows an illustration comparable to that in FIG. 1, with a temperature sensor being provided in this case, instead of the sensor arrangement for wear detection.

A temperature sensor 72 is provided in FIG. 7, and is likewise arranged in the region of the head face of the sliding contact element 10. A hole 74 extends into the sliding contact element 10, and the temperature sensor 72 can be moved to a lower position, as is illustrated by the temperature sensor 72' in the lower position. The temperature sensor 72 can thus be moved into the vicinity of that surface of the sliding contact element 10 which is subject to wear, so that it can detect the temperature there. If an excessive temperature occurs, an appropriate signal is emitted.

Instead of the temperature sensor or else the oscillation sensor, it is also possible to provide a current sensor, which measures the current flowing via the sliding contact element 10. A spring force sensor may also be provided, which detects the spring force of the compression spring 32 arranged in the telescopic tube 9, in order to make it possible to use this sensor to draw conclusions about the wear of the sliding contact element 10. The sensors described with reference to the individual exemplary embodiments may also be combined with one another.

| List of reference symbols | |
|---|---|
| 2 | Plug-in brush holder |
| 4 | Housing |
| 6 | Sliding contact receptacle |
| 8 | Housing part |
| 9 | Telescopic tube |
| 10 | Sliding contact element |
| 12 | Slipring |
| 14 | Boundary |
| 16 | Connecting element |
| 18 | Plastic tube |
| 20 | Instrumentation lance |
| 22 | Electronics module |
| 24 | Recess |
| 26 | Measurement lance |
| 28A, B | Relays |
| 30 | Permanent magnet |
| 32 | Compression spring |
| 34A, B | Signal module |
| 36 | Battery |
| 38 | Voltage limit value transmitter |
| 40A, B | Pushbuttons |
| 42 | Control lamp |
| 44 | Grip lever |
| 46 | Spring |
| 48 | Clamping body |
| 50 | Evaluation unit |
| 52A, B | Receiving module |
| 54 | Switch |
| 55 | Line contact |
| 56 | Indicating lamp |
| 58 | Buffer store |
| 60 | Infrared lamp |
| 61 | Infrared detector |
| 62 | Computer |
| 64 | Switching device |
| 65 | Air insulation shroud |
| 66 | Plug-in brush holder mount |
| 68 | Oscillation sensor |
| 70 | Second oscillation sensor |
| 72, 72' | Temperature sensor |
| 74 | Hole |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for monitoring a sliding contact element in a electrical rotating machine, comprising:
   a holder for the sliding contact element;
   a sensor for detection of a state variable of the sliding contact element; and
   an evaluation unit for evaluation of the state variable detected by the sensor, wherein signals are transmitted in a wireless manner, to the evaluation unit, wherein the sensor is constructed in two parts for detection of wear of the sliding contact element, one part being arranged such that it is stationary, and the other part being arranged such that it moves in a manner correlated to the wear, and wherein one part is in the form of a permanent magnet, and the other part is in the form of a relay.

2. The apparatus as claimed in claim 1, wherein the signals are transmitted via radio waves.

3. The apparatus as claimed in claim 2, wherein the sensor is connected to an electronics module, which includes a transmission module for transmission of the signals.

4. The apparatus as claimed in claim 3, further comprising:
   an autonomous power supply for operation of the sensor and of the electronics module.

5. The apparatus as claimed in claim 3, wherein the electronics module includes a buffer store.

6. The apparatus as claimed in claim 1, wherein a plurality of sliding contact elements are provided, each of which includes an associated sensor, and wherein the signals from a number of sensors are detected jointly by the evaluation unit.

7. The apparatus as claimed in claim 1, wherein the signals transmitted to the evaluation unit are coded.

8. The apparatus as claimed in claim 1, wherein a plurality of permanent magnets, associated with the relay, are provided at different positions for determination of different wear values.

9. The apparatus as claimed in claim 1, wherein a plurality of relays, which are at a distance from one another, are provided for determination of different wear values.

10. An apparatus for monitoring a sliding contact element in a electrical rotating machine, comprising:
    a holder for the sliding contact element;
    a sensor for detection of a state variable of the sliding contact element; and
    an evaluation unit for evaluation of the state variable detected by the sensor, wherein signals are transmitted in a wireless manner, to the evaluation unit, wherein the sensor is constructed in two parts for detection of wear of the sliding contact element, one part being arranged such that it is stationary, and the other part being arranged such that it moves in a manner correlated to the wear and wherein the sliding contact element is arranged in a sliding contact receptacle in a housing of the holder and includes a tubular housing part with an internal telescopic tube which interacts with the sliding contact element and to which a moving element is rigidly connected, which extends into the telescopic tube and on which the moving part of the sensor is arranged, with the stationary part of the sensor being arranged in a fixed position in the interior of the housing part.

11. The apparatus as claimed in claim 10, wherein the moving element is in the form of a tube, on whose inner wall the moving part is arranged in a fixed manner, and wherein an instrumentation lance is guided with the stationary part into the interior of the tube.

12. The apparatus as claimed in claim 11, wherein lines are routed through the instrumentation lance to the electronics module.

13. The apparatus as claimed in claim 1, further comprising:
    an oscillation sensor for detection of unacceptable oscillations.

14. The apparatus as claimed in claim 13, wherein different oscillation directions are detectable, such that they can be distinguished from one another, via the oscillation sensor.

15. The apparatus as claimed in claim 13, wherein the measurement signals which are detected by the oscillation sensor are storable, and wherein the evaluation unit is designed to carry out a long-term comparison.

16. The apparatus as claimed claim 1, further comprising:
 a temperature sensor for detection of the temperature in the region of the sliding contact element.

17. The apparatus as claimed in claim 16, wherein the sliding contact element includes a hole, in which the temperature sensor is movable.

18. The apparatus as claimed in claim 17, further comprising at least one of: a current sensor for detection of the current flowing via the sliding contact element; and a spring force sensor for detection of a spring force produced by a spring acting on the sliding contact element.

19. An apparatus for monitoring a sliding contact element in a electrical rotating machine as claimed in claim 17, wherein the electrical rotating machine is a turbo-generator.

20. The apparatus as claimed in claim 17, wherein the signals are transmitted opto-electronically.

21. The apparatus as claimed in claim 2, wherein the sensor is connected to an electronics module, which includes a transmission module for transmission of the signals.

22. The apparatus as claimed in claim 4, wherein the electronics module includes a buffer store.

23. The apparatus as claimed in claim 2, wherein a plurality of sliding contact elements are provided, each of which includes an associated sensor, and wherein the signals from a number of sensors are detected jointly by the evaluation unit.

24. The apparatus as claimed in claim 3, wherein a plurality of sliding contact elements are provided, each of which includes an associated sensor, and wherein the signals from a number of sensors are detected jointly by the evaluation unit.

25. The apparatus as claimed in claim 2, wherein the signals transmitted to the evaluation unit are coded.

26. The apparatus as claimed in claim 3, wherein the signals transmitted to the evaluation unit are coded.

27. The apparatus as claimed in claim 2, wherein the sensor is constructed in two parts for detection of wear of the sliding contact element, one part being arranged such that it is stationary, and the other part being arranged such that it moves in a manner correlated to the wear.

28. The apparatus as claimed in claim 3, wherein the sensor is constructed in two parts for detection of wear of the sliding contact element, one part being arranged such that it is stationary, and the other part being arranged such that it moves in a manner correlated to the wear.

29. An apparatus for monitoring a sliding contact element in a electrical rotating machine, comprising:
 a holder for the sliding contact element;
 a sensor for detection of a state variable of the sliding contact element; and
 an evaluation unit for evaluation of the state variable detected by the sensor, wherein signals are transmitted in a wireless manner, to the evaluation unit, wherein the signals are transmitted via radio waves, wherein the sensor is constructed in two parts for detection of wear of the sliding contact element, one part being arranged such that it is stationary, and the other part being arranged such that it moves in a manner correlated to the wear and wherein one part is in the form of a permanent magnet, and the other part is in the form of a relay.

30. An apparatus for monitoring a sliding contact element in a electrical rotating machine, comprising:
 a holder for the sliding contact element;
 a sensor for detection of a state variable of the sliding contact element; and
 an evaluation unit for evaluation of the state variable detected by the sensor, wherein signals are transmitted in a wireless manner, to the evaluation unit, wherein the sensor is connected to an electronics module, which includes a transmission module for transmission of the signals, wherein the sensor is constructed in two parts for detection of wear of the sliding contact element, one part being arranged such that it is stationary, and the other part being arranged such that it moves in a manner correlated to the wear and wherein one part is in the form of a permanent magnet, and the other part is in the form of a relay.

31. The apparatus as claimed in claim 8, wherein a plurality of relays, which are at a distance from one another, are provided for determination of different wear values.

32. The apparatus as claimed in 10, wherein the tubular housing part is adjacent to the sliding contact receptacle.

33. The apparatus as claimed in claim 2, further comprising:
 an oscillation sensor for detection of unacceptable oscillations.

34. The apparatus as claimed in claim 3, further comprising:
 an oscillation sensor for detection of unacceptable oscillations.

35. The apparatus as claimed claim 2, further comprising:
 a temperature sensor for detection of the temperature in the region of the sliding contact element.

36. The apparatus as claimed claim 3, further comprising:
 a temperature sensor for detection of the temperature in the region of the sliding contact element.

37. The apparatus as claimed in claim 14, wherein the measurement signals which are detected by the oscillation sensor are storable, and wherein the evaluation unit is designed to carry out a long-term comparison.

38. The apparatus as claimed in claim 2, further comprising at least one of:
 a current sensor for detection of the current flowing via the sliding contact element; and
 a spring force sensor for detection of a spring force produced by a spring acting on the sliding contact element.

39. The apparatus as claimed in claim 3, further comprising at least one of:
 a current sensor for detection of the current flowing via the sliding contact element; and
 a spring force sensor for detection of a spring force produced by a spring acting on the sliding contact element.

* * * * *